United States Patent [19]

Kamada et al.

[11] 4,085,234

[45] Apr. 18, 1978

[54] PROCESS FOR MANUFACTURING FAST COOKING RICE

[75] Inventors: Hidemoto Kamada, Tokyo; Chiaki Miura; Etsuo Kano, both of Kawasaki, all of Japan

[73] Assignee: Calpis Shokuhin Kogyo Kabushiki Kaisha, Tokyo, Japan

[21] Appl. No.: 704,579

[22] Filed: Jul. 12, 1976

[30] Foreign Application Priority Data

Jul. 16, 1975 Japan ............................... 50-86157

[51] Int. Cl.² ............................................. A23L 1/182
[52] U.S. Cl. ..................................... 426/618; 426/625
[58] Field of Search ................ 426/618, 625, 445, 447

[56] References Cited

U.S. PATENT DOCUMENTS

| 2,278,463 | 4/1942 | Musher | 426/447 X |
| 2,278,470 | 4/1942 | Musher | 426/447 X |

Primary Examiner—Joseph M. Golain
Attorney, Agent, or Firm—Stevens, Davis, Miller & Mosher

[57] ABSTRACT

Fast cooking rice which readily reconstitutes itself into cooked rice is manufactured by a process which comprises forming gel on the surface and to the inside center of rice grains puffed in advance to a high degree and subsequently subjecting the treated puffed rice grains to drying and shrinking treatments.

8 Claims, No Drawings

PROCESS FOR MANUFACTURING FAST COOKING RICE

BACKGROUND OF THE INVENTION

Cooked rice which is a staple food in the countries of East Asia is so-called "steamed and boiled rice." It is cooked by a time-consuming procedure which comprises the steps of first washing raw rice (which means hulled rice in the instant specification and claims) with water, allowing the washed rice to absorb water amply and thereafter steaming and boiling the water-impregnated rice for a long time. Ample impregnation with water and an appropriate extent of boiling and steaming are required for preparing the cooked rice of soft texture and agreeable teeth-resistance. The requirement for rigid control of these conditions prevents quick cooking. The fact that this cooking consumes much time also constitutes one disadvantage.

Another typical example of cooked rice is pilaf. This is prepared by frying washed rice with oil, whereafter the fried rice is steamed and boiled in the presence of added water. It has the disadvantage that the texture is generally hard. This disadvantage can be overcome by continuing the treatment of steaming and boiling for a relatively long time. Nevertheless, it still has a drawback in that the cooking consumes much time. In view of the above, there is a need for development of fast cooking rice which readily provides cooked rice of the class described above.

What is called "gelatinized rice" has heretofore been regarded as a kind of fast cooking rice. This is usually prepared by subjecting the rice to the ordinary treatment of steaming and boiling for thereby gelatinizing the rice starch and thereafter drying the starch-gelatinized rice. By mere addition of hot water at a temperature of about 80° C or over, however, the fast cooking rice prepared as described above fails to reconstitute itself into cooked rice possessed of the desired texture. It is not converted into desirable cooked rice unless it is boiled for several minutes by heating. Such time-consuming treatment does not befit the fast cooking rice for which instantaneousness counts strongly.

There is Japanese Patent Publication No. 1581/1958 which employs substances similar to those used in the present invention for treating rice grains. But, this publication aims to prepare highly nutritious rice grains by coating raw rice grains with sodium alginate, cow's milk and powdered milk. As this rice grain is quite raw, it requires the ordinary treatment of steaming and boiling for providing a cooked rice. Therefore, this prior art is obviously different from the present invention in the object and the product to be prepared.

A method which produces cooked rice by mere addition of hot water has been disclosed by Japanese Patent Publication No. 5729/1959. The method disclosed therin comprises first steaming and boiling the raw rice to a extent mild enough to pregelatinize the surface layer of the rice grains, then causing the steamed and boiled rice to absorb a paste such as dextrin or sodium carboxymethyl cellulose, subjecting the treated rice to a treatment for regular steaming and boiling for thereby completely gelatinizing the rice grains to the inside center and finally drying the gelatinized rice. The fast cooking rice which is obtained by this method has the disadvantage that, when hot water is added thereto immediately before its consumption, the required reconstitution takes much time or the reconstituted rice has a rather hard texture, possibly because the rice, in the final treatment of drying, suffers partial retrogradation of the rice starch which has once been gelatinized. Furthermore, the process of manufacture is complicated.

Studies have also been continued with a view to producing fast cooking rice which can be reconstituted into as exact an equivalent of regular boiled and steamed rice as practicable. For example, there is a method which utilizes puffed rice, with due consideration of the fact that gelatinized rice is obtained by puffing rice grains. If simply puffed rice is used as a fast cooking rice, it is quickly softened in the presence of hot water added thereto prior to its consumption. Nevertheless, it has the disadvantage that the hot water deprives the rice grains of their shape and renders them quite different from regular boiled and steamed rice in taste, texture, viscoelasticity, etc. Japanese Patent Publication No. 27700/1971 discloses a method which comprises the steps of first puffing raw rice to a slight extent, then immersing the puffed rice in water for thereby heightening the water content thereof, subsequently gelatinizing the puffed rice of increased water content, thereafter drying the gelatinized rice until the water content thereof decreases to a prescribed level and finally re-puffing the dried rice. The fast cooking rice produced by this method, however, suffers from an undesirable spongy texture and poor teeth-resistance. It has the further disadvantages that the process for manufacture is complicated and the yield is consequently low.

As described above, there have been conceived methods for the manufacture of fast cooking rice which combine the treatment of puffing with other treatments. These conventional methods, however, are complicated from the operational point of view because the water content of rice grains must be rigidly regulated in the course of treatments and consequently because the rigid regulation of water content calls for additional treatments, and so on. Methods which involve use of oil and fat are not desirable because the oil and fat incorporated into the rice grains degrade the taste and induce oxidation of itself to the extent of heavily impairing the quality of fast cooking rice. Also the removal of excess oil and fat in the course of manufacture demands much time and labor.

SUMMARY OF THE INVENTION

The primary object of the present invention is to provide a process for the manufacture of fast cooking rice easily, and providing cooked rice which, when served for meals, retains the shape of rice grains unimpaired, and permits the rice grains to remain in their inherent shape which excel in texture, taste, flavor, etc.

Another object of this invention is to provide a fast cooking rice which is so easily reconstituted that it can be ready for a meal after several minutes of standing in hot water of a temperature of not less than about 80° C.

Still another object of the present invention is to provide a fast cooking rice which is so easily reconstituted that it affords pilaf of a desirable texture after several minutes of cooking such as in a frying pan in the presence of a small amount of water and, by preference, of some oil added thereto.

Yet another object of this invention is to provide a fast cooking rice capable of a wide range of applications such that it readily produces curry-flavored fried rice and many other kinds of cooked rice when cooked in combination with seasoning agents, dry vegetables, dry meat and other foodstuffs.

It is also an object of this invention to provide a simple process for the manufacture of fast cooking rice without entailing complicated steps of treatment from the operational point of view.

DETAILED DESCRIPTION OF THE INVENTION

This invention has been accomplished on the basis of a study continued with a view to obtaining a fast cooking rice of excellent quality by a process as simple as possible. In brief this invention comprises preparing a rice puffed to a high degree, adding onto the surface and also to the inside center of the puffed rice a thickener to be gelled by metallic ions and said metallic ion, drying and shrinking the treated puffed rice grains. The invention will be described in futher detail below.

The first step is to prepare rice puffed to a high degree. The rice grains to be used in making the puffed rice may be of any of the numerous species available. For the purpose of this invention, the puffed rice grains obtained by any methods other than the method resorting to the treatment in heated oil and fat can be used. For example, the puffed rice obtained by first treating rice grains in a closed container kept at elevated temperatures under increased pressure and releasing the rice grains into the atmosphere for thereby allowing them to puff, those puffed by means of heated air, those puffed by having rice grains heated with high-frequency waves and those puffed by having rice grains roasted in conjunction with heated grains such as of common salt, fine sand, ceramic, or those puffed by some other similar puffing method are all usable for this invention. The degree of puffing is desired to be from 6 to 16 times, preferably from 10 to 12 times, as large in volume (hereinafter the degrees of puffing will be expressed in terms of "volume") as the raw rice grains. The degree of puffing of the figures (6 to 16 ) as used in the instant specification and claims illustrates an average of each rice grain because the size and quality of each rice grain is different. For example, "6 times" includes the degree of puffing of a little bit smaller and also larger than 6 times.

The second step is to immerse the puffed rice in an aqueous solution containing at least one thickener to be gelled by metallic ions or to spray or sprinkle said aqueous solution on the puffed rice. The term "thickener to be gelled by the metallic ions" as used in the instant specification and also the claims refers to polysaccharides of plant origin, their derivatives, and polysaccharides produced by the fermentation of microorganisms. Concrete examples of the polysaccharides which are gelled by the metallic ions are alginic acid, its salt, carrgeenin, pectin, etc.

The concentration of the aqueous solution of a thickener involving formation of a gel by metallic ions should generally fall in the range of from 0.2 w/w to 3.0 w/w percent (hereinafter indicated invariably in percent by weight/weight). This range is variable to some extent with the particular kinds of thickeners to be used. To attain the effect aimed at in a short time, a concentration below the lower limit 0.2 percent does not suffice. When the concentration exceeds the upper limit 3.0 percent, however, the viscosity of the aqueous solution increases to an extent such that the solution will not permit ready penetration into the puffed rice nor easy handling, the individual rice grains tend to adhere mutually and the final product gives an undesirable taste. The temperature of the aqueous solution and the duration of immersion in this aqueous solution are not specifically limited by the present invention. The purpose of the immersion is amply attained when the immersion is for a brief period of about 30 seconds at a temperature falling within the range extending from normal rool temperature to 90° C, for example. Where the addition is effected by spraying or sprinkling, the treated rice, as a matter of course, should be left to stand at rest for a while to ensure uniform and thorough penetration of the aqueous solution into the puffed rice. Consequently, the thickener to be gelled by the metallic ions thoroughly penetrates from the surface to the inside center of the puffed rice having a porous texture.

The third step is to immerse the above treated puffed rice in an aqueous solution containing metallic ions capable of inducing gelation of the thickener or to spray or sprinkle the aqueous solution on the puffed rice. In the conventional prior art, there are methods for producing a fast cooking rice by immersing the rice grains or spraying on the rice grains using a thickener. But, these are treatments only on the surface of the rice grains. The method of the present invention differs from these methods on this point and is characterized by the ample gelation also in the inside center of the rice grain.

The expression "aqueous solution containing metallic ions" as used in the present invention refers to an aqueous solution containing free metallic ions. Examples of the aqueous solution satisfying this definition include aqueous solutions prepared by addition of metallic salts, solutions prepared by an ion exchange treatment, naturally occurring mineral waters containing metallic ions and natural aqueous solutions which originate in animals and plants. Of the various aqueous solutions described above, the aqueous solutions prepared by addition of metallic salts will be described by way of exemplification.

In the preparation of aqueous solutions containing metallic salts, examples of the metallic salts usable for this purpose include calcium salts, potassium salts, magnesium salts and other similar metallic salts of carbonic acid, hydrochloric acid, sulfuric acid, phosphoric acid, acetic acid, lactic acid, citric acid, ascorbic acid, glycerophosphoric acid and other similar acids.

In the solution containing metallic ions capable of acting upon the thickener to be gelled by the metallic ions and consequently inducing gelation, the concentration of the metallic ions is only required to be such that the absolute amount of metallic ion present therein is enough to bring about the effect of gelation. Whether the combination of the respective kinds of the aqueous solutions containing the thickener and the metallic ions separately and the combination of their respective concentrations are proper or not for the purpose of this invention can be confirmed by mixing the two aqueous solutions in the absence of puffed rice and examining the resultant mixture to find the presence or absence of the ensuing reaction of gelation. Thus the selection of a proper combination can easily be accomplished. The contact time between the thickener and the metallic ions has some bearing on the strength of the gel to be consequently formed. For example, a strong gel is formed by allowing an ample contact time, so that the finally produced fast cooking rice provides enhanced teeth resistance when it is reconstituted with hot water and served for a meal. Thus, the degree of resistance to the teeth can be controlled by suitably selecting the length of contact time for gelation. The kinds and concentrations of the aqueous solutions, the temperature, contact time and pH status involved in the treatment can be suitably selected from conditions generally practiced in most treatments for gelation. Further and more specific information thereon is made apparent in several examples to be cited afterward. The object of the present invention is also accomplished by conversely performing the second step and the third step.

The final fourth step is to dry, by an ordinary method, the puffed rice in to which the thickener or the gelled thickener has been incorporated as described above. The drying may be carried out under normal atmospheric pressure or under vacuum, either in the absence or in the presence of heating. During the drying, the individual grains of the puffed rice may be kept stationary or may be moved. The method of drying, therefore, can suitable be selected by taking into due consideration the amount of puffed rice, the desired duration of drying time (reflecting readiness of handling), the desired quality of the fast cooking rice to be produced, etc. Where the drying is effected by application of heat, due attention should be paid to avoiding excessive heating which frequently results in the occurrence of burnt rice emitting an objectionable odor. Concrete examples of driers well known for this purpose include a tunnel and band dryer, a chamber dryer, and an infared dryer, etc.

In consequence of the gradual vaporization of water, the puffed rice diminishes in volume eventually to approach the volume of raw rice while the incorporated gelled thickener is retained throughout from the surface to the inside center of individual rice grains. To obtain a fast cooking rice which gives a desirable texture when served for a meal and yet is not so bulky as to impair the ease of handling, the process of drying is desirably terminated at the time by which the volume of the treated puffed rice has decreased to less than three times the volume of raw rice.

To the aqueous solution of thickener, to the aqueous solution of metallic ions, to the puffed rice which has incorporated a gelled thickener, or to the fast cooking rice which has undergone the treatment of drying, various seasoning agents, nutrition enriching agents, color-improving agents, etc., may be suitably added and blended therewith. As a result, there can easily be produced a flavored fast cooking rice.

As described in detail up to this point, this invention comprises the first step of puffing rice grains to a high degree for thereby gelatinizing rice starch, inducing cleavage of rice starch micelle, forming a porous texture in the rice grains and causing a specific thickener in a gelled form to be amply entrapped within the rice grains and the subsequent step of drying the treated puffed rice to the extent of allowing the rice grains to dwindle to a prescribed volume. The fast cooking rice which is manufactured as described above provides high yields of production and high preservability and, upon reconstitution, converts itself into a cooked rice excelling in taste, texture and flavor.

Reconstitution of this fast cooking rice, for example, into ordinarily cooked rice can be obtained by adopting a method which is generally practiced in preparing fast cooking rices of this kind. To be specific, the desired reconstitution into cooked rice can be accomplished by allowing this fast cooking rice to stand for 1 to 2 minutes in hot water heated in advance to about 80° C or over and added in a volume roughly 1 to 1.5 times the volume of rice, then discarding an excess portion of said hot water and thereafter allowing the rice to be steamed for 3 to 4 minutes with the remaining heat. The fast cooking rice can be reconstituted into a soup containing rice grains by following the same procedure except for removal of excess hot water. The fast cooking rice produced by this invention can be also amply reconstituted into a cooked rice of good quality when it is left to stand in water of normal room temperature for about 30 minutes. When the fast cooking rice is reconstituted with milk instead of water of normal room temperature, the resultant cooked rice tastes good. For a user who feels like eating pilaf, a pilaf of mild texture can be obtained by heating the fast cooking rice of this invention such as in a frying pan in the presence of a small amount of oil and fat and a suitable amount of water.

Obviously modifications and variations are possible insofar as they do not depart from the spirit and scope of the present invention. This invention is not limited to the specific embodiments thereof except as defined in the appended claim.

EXAMPLE 1

A raw rice was expaned by use of heated air at 300° C into a puffed rice having a volume of six times as large. One (1.00) kg of this puffed rice was sprayed with 1.86 kg of 0.2% aqueous solution of sodium alginate at normal room temperature, then left to stand for about 10 minutes and then sprayed with 0.64 kg of 2.0% aqueous solution of calcium lactate at room temperature, then left to stand for about 10 minutes and thereafter dried in a drying oven at 80° C for 3 hours. There was consequently obtained 0.96 kg of a fast cooking rice having a volume of about 2.4 times that of the raw rice. This fast cooking rice was placed in a container provided with a lid. The same volume of hot water at 95° C was poured into the container. The rice and the hot water in the container were left to stand for 90 seconds. Then, the excess hot water was discarded. Thereafter, the fast cooking rice was left to be steamed for 3 minutes with the remaining heat. consequently, there was obtained a cooked rice excellent in taste, texture and flavor.

EXAMPLE 2

A raw rice was expanded by a puffing gun into a puffed rice having a volume of 11 times as large. One (1.00) kg of this puffed rice was immersed in 0.5% aqueous solution of a low methyl ester pectin at normal room temperature for 60 seconds and then immersed again in 0.5% aqueous solution of calcium chloride at 60° C for 60 seconds. The puffed rice thus treated was dired in a drying oven at 60° C for 4 hours to afford 0.98 kg of a fast cooking rice having a volume of 2.4 times as large as that of the raw rice. A cooked rice of excellent taste, flavor and texture was obtained by subjecting 200 g of this fast cooking rice to heating in a frying pan in the presence of 600 g of water and a small amount of salad oil added thereto.

EXAMPLE 3

A raw rice was expanded by a puffing gun into a puffed rice having a volume of 15 times as large. One (1.00) kg of this puffed rice was immersed in an aqueous solution of 0.5% sodium alginate and 0.5% low methyl ester pectin at 60° C for 30 seconds, then immersed again in an aqueous solution containing 3.0% of calcium lactate, 3.0% of chicken soup, 0.5% of sodium chloride and 0.03% of seasoning agent at normal room temperature for 45 seconds, and thereafter dried in a drying oven at 95° C for 2.5 hours. Consequently, there was obtained 0.99 kg of fast cooking rice having a volume of 2.9 times as large as that of the raw rice. A flavored cooked rice of excellent taste was obtained by subjecting this fast cooking rice to a treatment similar to that of Example 1.

EXAMPLE 4

A raw rice was expanded by puffing gun into a puffed rice having a volume of 15 times as large. One (1.00) kg of this puffed rice was immersed in 2.0% aqueous solution of calcium and potassium-sensitive carrageenin at 80° C for 30 seconds, and then immersed again in an aqueous solution containing 1.0% of calcium lactate and 1.0% of potassium monohydrogenphosphate at 80° C for 60 seconds. When the treated rice was dried for 5 hours under conditions of 45° ± 5° C and a vacuum of less than 10 mmHg, there was obtained 1.0 kg of fast cooking rice having a volume of 1.6 times that of the raw rice. A cooked rice of excellent quality was obtained by subjecting this fast cooking rice to a treatment similar to that of Example 1.

EXAMPLE 5

A raw rice was expanded by a puffing gun into a puffed rice having a volume of 11 times as large. One (1.00) kg of this puffed rice was immersed in 1.0% aqueous solution of calcium chloride at 40° C for 15 seconds, then immersed again in 0.5% aqueous solution of sodium alginate at 40° C for 120 seconds, and thereafter dried in a drying oven at 80° C for 3 hours. Consequently, there was obtained 0.94 kg of fast cooking rice having a volume of 2.6 times as large as that of the raw rice. A flavored steeped rice of excellent taste was obtained by adding to this fast cooking rice small amounts of powdered sea weed and powdered green tea, a suitable amount of sodium chloride and a small amount of dried salmon flakes and allowing the resulting mixture to stand in hot water at 90° C for 3 minutes.

What is claimed is:

1. A process for the manufacture of fast cooking rice, consisting essentially of puffing raw rice into a puffed rice having a volume of 6 to 16 times as large, contacting said puffed rice with a solution of at least one thickener susceptible to gelling by metallic ions, in a concentration of about 0.2 to about 3.0% by weight sufficiently to penetrate to the inside center of the puffed rice, then contacting said rice with a solution of said metallic ions to thereby gell said thickener and subsequently drying the treated puffed rice whereby it is reduced in volume.

2. A process according to claim 1 wherein said thickener is a polysaccharide or a derivative thereof.

3. A process according to claim 1 wherein said thickener is alginic, acid, salts thereof carrgeenin, or a low methyl ester pectin.

4. A fast cooking rice produced according to the process of claim 1.

5. A process for the manufacture of fast cooking rice, consisting essentially of puffing raw rice into a puffed rice having a volume of 6 to 16 times as large, contacting the puffed rice with a solution of metallic ions, then contacting said rice with a solution of a thickener susceptible to gelling by said metallic ions to thereby gell said thickener and subsequently drying the treated puffed rice to reduce the volume thereof, the concentration of the solution of the thickener being about 0.2 to about 3.0% by weight and the contacting of the puffed rice therewith being sufficient to penetrate to the inside center of the puffed rice, the concentration of the solution of metallic ions being sufficient to cause gellation of said thickener.

6. A process according to claim 5 wherein said thickener is a polysaccharide or a derivative thereof.

7. A process according to claim 5 wherein said thickener is alginic acid salts thereof, carrageenin, or a low methyl ester pectin.

8. A fast cooking rice produced according to the process of claim 5.

* * * * *

UNITED STATES PATENT OFFICE
CERTIFICATE OF CORRECTION

Patent No. 4,085,234    Dated April 18, 1978

Inventor(s) Hidemoto KAMADA et al

It is certified that error appears in the above-identified patent and that said Letters Patent are hereby corrected as shown below:

Column 2, line 41, change "itself" to read -- said oil and fat --.

Column 4, line 5, change "rool" to read -- room --.

Column 8, line 14, change "alginic, acid, salts thereof carrgeenin," to read -- alginic acid, salts thereof, carrageenin, --.

Column 8, line 35, change "alginic acid salts thereof," to read -- alginic acid, salts thereof --.

Signed and Sealed this

Twenty-sixth Day of September 1978

[SEAL]

Attest:

RUTH C. MASON
Attesting Officer

DONALD W. BANNER
Commissioner of Patents and Trademarks